US012651103B2

(12) United States Patent
Schmidt et al.

(10) Patent No.: US 12,651,103 B2
(45) Date of Patent: Jun. 9, 2026

(54) METHOD OF TRANSMISSION MECHANISM DESIGN

(71) Applicant: DASSAULT SYSTEMES, Vélizy-villacoublay (FR)

(72) Inventors: Martin-Pierre Schmidt, Vélizy-villacoublay (FR); Claus Bech Wittendorf Pedersen, Hamburg (DE); David Leo Bonner, Vélizy-villacoublay (FR)

(73) Assignee: DASSAULT SYSTEMES, Vélizy-villacoublay (FR)

( * ) Notice: Subject to any disclaimer, the term of this patent is extended or adjusted under 35 U.S.C. 154(b) by 898 days.

(21) Appl. No.: 17/973,227

(22) Filed: Oct. 25, 2022

(65) Prior Publication Data

US 2023/0133725 A1 May 4, 2023

(30) Foreign Application Priority Data

Oct. 25, 2021 (EP) .................................... 21306482

(51) Int. Cl.
*G06F 30/23* (2020.01)
*G06F 111/10* (2020.01)
(Continued)

(52) U.S. Cl.
CPC .......... *G06F 30/23* (2020.01); *G06F 2111/10* (2020.01); *G06F 2119/14* (2020.01); *G06T 17/205* (2013.01)

(58) Field of Classification Search
CPC .. G06F 30/23; G06F 2111/10; G06F 2111/04; G06F 2119/14; G06T 17/205
See application file for complete search history.

(56) References Cited

U.S. PATENT DOCUMENTS 10,073,928 B2 * 9/2018 Saito ........................ G06F 30/00
10,824,780 B2 * 11/2020 Zhang ........................ E05D 1/02
(Continued)

OTHER PUBLICATIONS

Norato, J., et al. "A topological derivative method for topology optimization" Struct. Multidisciplinary Optimization, vol. 33, pp. 375-386 (2007) (Year: 2007).*

(Continued)

*Primary Examiner* — Jay Hann
(74) *Attorney, Agent, or Firm* — Oblon, McClelland, Maier & Neustadt, L.L.P.

(57) ABSTRACT

A computer-implemented method for designing a 3D modeled object representing a transmission mechanism with a target 3D motion behavior. The method including obtaining a 3D finite element mesh and data associated to the mesh, performing a topology optimization based on the mesh and on the associated data, therefore obtaining a density field representing distribution of material quantity of the 3D modeled object. The method further includes computing a signed field based on the density field and the associated data, identifying one or more patterns of convergence and divergence in the signed field, each pattern forming a region of the signed field, and for each identified pattern, identifying a joint representative of the identified pattern and replacing a part of the density field corresponding to the respective region formed by the identified pattern by a material distribution representing the identified joint.

20 Claims, 8 Drawing Sheets

(51) Int. Cl.
 *G06F 119/14* (2020.01)
 *G06T 17/20* (2006.01)

(56) References Cited

U.S. PATENT DOCUMENTS

| | | | | |
|---|---|---|---|---|
| 10,865,867 | B2 * | 12/2020 | Anand | F16H 55/17 |
| 11,455,438 | B2 * | 9/2022 | Nomura | G06F 30/20 |
| 12,430,483 | B2 * | 9/2025 | Eom | B33Y 50/00 |
| 2007/0239411 | A1 * | 10/2007 | Yamashita | G06F 30/23 |
| | | | | 703/7 |
| 2019/0197210 | A1 * | 6/2019 | Bonner | B33Y 50/00 |
| 2020/0143009 | A1 * | 5/2020 | Schmidt | G06F 30/17 |

OTHER PUBLICATIONS

Extended European Search Report issued Jun. 30, 2022 in European Patent Application No. 21306482.7 filed Oct. 25, 2021, citing document Nos. 24-26 therein, 14 pages.
Sigmund, O., et al., "Topology optimization approaches: A comparative review", Structural and Multidisciplinary Optimization, 48(6), pp. 1031-1055, https://doi.org/10.1007/s00158--013-0978-6, 2013, 1 total page (with Abstract).
Waldron, K.J., et al., "Kinematics, dynamics, and design of machinery", John Wiley & Sons, 2016, 5 total pages.
Ye, W., et al., "Type Synthesis of Lower Mobility Parallel Mechanisms: A Review", Chinese Journal of Mechanical Engineering (English Edition), 32(1), https://doi.org/10.1186/s10033-019-0350-x, 2019, pp. 1-11.
Zhu, B., et al., "Design of compliant mechanisms using continuum topology optimization: A review", Mechanism and Machine Theory, 143, https://doi.org/10.1016/j.mechmachtheory, 2020, 103622, pp. 1-34.
Howell, L.L., et al., "Handbook of Compliant Mechanisms", John Wiley & Sons, 2013, 14 total pages.
Ananthasuresh, S.G.K., "Optimal Synthesis Methods for MEMS", Springer, 2003, 5 total pages (with Abstract).
Sigmund, O., "On the Design of Compliant Mechanisms Using Topology Optimization", Mechanics of Structures and Machines, vol. 25(4), pp. 493-524, 1997, 1 total page (with Abstract).
Baran, I., et al., "Automatic rigging and animation of 3D characters", ACM Trans. Graph. 26, 3 (Jul. 2007), https://www.cs.toronto.edu/~jacobson/seminar/baran-and-popovic-2007.pdf, 2007, 1 total page (with Abstract).
Wang et al., "Topological design of compliant smart structures with embedded movable actuators", Smart Materials and Structures; 23(4), 2014, 2 total pages (with Abstract).
Yin, L., et al., "Design of Distributed Compliant Mechanisms", Mechanics Based Design of Structures and Machines, vol. 31, No. 2, Jan. 6, 2003, pp. 151-180.
Wang, M., "A Kinetoelastic Approach to Continuum Compliant Mechanism Optimization", Proceedings of IDETC/CIE 2008 ASME, International Design Engineering Technical Conferences & Computers and Information in Engineering Conference, Aug. 3-6, 2008, pp. 1-13.
Zhu, B., et al., "Design of compliant mechanisms using continuum topology optimization: A review", Mechanism and Machine Theory, Pergamon, Amsterdam, NL, vol. 143, Sep. 27, 2019 (Sep. 27, 2019), XP085888526, ISSN: 0094-114X, DOI: 10.1016/J.MECHMACHTHEORY.2019.103622, pp. 1-34.

\* cited by examiner

3010

3030

3040

3020

3000

4020

Material in
compression

Material in
tension p

4010

5010

5020

METHOD OF TRANSMISSION MECHANISM DESIGN

CROSS REFERENCE TO RELATED APPLICATIONS

This application claims priority under 35 U.S.C. § 119 or 365 to European Application No. 21306482.7, filed Oct. 25, 2021. The entire contents of the above application are incorporated herein by reference.

TECHNICAL FIELD

The disclosure relates to the field of computer programs and systems, and more specifically to a method, system and program for designing a 3D modeled object representing a transmission mechanism with a target motion behavior.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some of these systems provide functionalities which allow or help the design of transmission mechanisms. Some notably allow the designer to deal with a virtual version of the transmission mechanism at an early design step.

The following papers relate to this field and are referred to hereunder

[1] Sigmund and Maute, "Topology optimization approaches: A comparative review", Structural and Multidisciplinary Optimization, 48(6), 2013, pp. 1031-1055;

[2] Waldron et al., "*Kinematics, dynamics, and design of machinery.*" *John Wiley & Sons*, 2016;

[3] Ye and Li. "Type Synthesis of Lower Mobility Parallel Mechanisms: A Review", Chinese Journal of Mechanical Engineering (English Edition), 32(1), 2019;

[4] Zhu et al., "Design of compliant mechanisms using continuum topology optimization: A review", Mechanism and Machine Theory, 143, 2020;

[5] Howell et al., "*Handbook of compliant mechanisms*", John Wiley & Sons, 2013;

[6] Ananthasuresh, "*Optimal Synthesis Methods for MEMS*", Vol. 13, Springer Science & Business Media, 2003;

[7] Sigmund, "*On the design of compliant mechanisms using topology optimization*", Mechanics of Structures and Machines, 25(4), 1997, pp. 493-524; and

[8] Wang et al, "*Topological design of compliant smart structures with embedded movable actuators*", Smart Materials and Structures; 23(4), 2014.

These methods lack accuracy, depend on a priori information, do not provide a scalable computational efficiency with respect to the complexity of the transmission mechanism, and/or do not produce designs which represent realistically manufacturable mechanical parts. Some of these methods produce results which are not industrially feasible, restricted to compliant mechanisms, and/or which are industrially unrealistic.

Within this context, there is still a need for an improved method for designing a 3D modeled object representing a transmission mechanism with a target 3D motion behavior.

SUMMARY

It is therefore provided a computer-implemented method for designing a 3D modeled object representing a transmission mechanism with a target 3D motion behavior, the transmission mechanism being formed in a material and comprising at least one joint. The method comprises providing a 3D finite element mesh and data associated to the 3D finite element mesh. The data comprises one or more input forces forming one or more respective loads case, one or more boundary conditions, one or more parameters related to the material, a global quantity constraint relative to a global quantity of the material in the 3D finite element mesh, and a target 3D motion behavior. The method further comprises performing a topology optimization based on the 3D finite element mesh and on the data associated to the 3D finite element mesh therefore obtaining a density field, the density field representing distribution of material quantity of the 3D modeled object. The method further comprises computing a signed field based on the density field and the data associated to the 3D finite element mesh, and identifying one or more patterns of convergence and divergence in the signed field, each of the one or more patterns forming a region of the signed field. The method further comprises for each identified pattern, identifying a joint representative of the identified pattern and replacing a part of the density field by a material distribution representing the identified joint, each replaced part of the density field corresponding to the respective region of the signed field formed by the identified pattern.

The method may comprise one or more of the following:
- the performing of the topology optimization further comprises thresholding the density field after performing the topology optimization;
- the computing of the signed field comprises performing a finite element analysis based on the density field, the 3D finite element mesh, and the data associated to the 3D finite element mesh therefore obtaining a displacement field on the 3D finite element mesh; and computing the signed field from the density field and the displacement field;
- the computing of the signed field further comprises computing a strain from the displacement field, the signed field comprising, for each element of the signed field, a value being equal to a value of the computed strain, and a sign being equal a sign of a dilation of the computed strain;

the computing of the signed field further comprises smoothing the signed field by a smoothing filter, such as a Gaussian filter;

the identifying one or more patterns of convergence and divergence comprises:

computing a detection field from the computed signed field, the detection field comprising elements, each element of the detection field corresponding to one element of the signed field, each element of the detection field representing a local distribution of the values of the computed signed field, a detection filter adapted for a joint type being used for selecting values of the computed signed field that are representative of the local distribution;

determining elements of the computed detection field having a respective associated value not respecting a threshold value; and identifying one or more patterns of convergence and divergence in the determined elements of the computed detection field, each of the identified one or more patterns of convergence and divergence in the determined elements of the computed detection field comprising a set of neighboring elements of the determined elements and forming the respective region of the signed field formed by the identified pattern;

the selecting, by the detection filter of, values of the computed signed field that are representative of the local distribution comprises selecting two or more elements of the signed field, the two or more elements of the signed field being located in a neighborhood of the element of the signed field for which a detection field is computed;

the selecting two or more elements of the signed field further comprises identifying two or more elements of the signed field intersecting a sphere centered on the element of the signed field for which the detection field is computed, for example, the sphere having a radius larger than a length-scale value used for the performing a topology optimization;

the selecting two or more elements of the signed field further comprises setting one or more pairs of antipodal points of the signed field located on the sphere, each pair of antipodal points belonging in a respective pair of antipodal elements, each point of a pair of antipodal points having a value of the computed signed field of its respective element; and wherein the computing a detection field from the computed signed field further comprises computing a sum of pairwise products of the respective values of the antipodal points, the sum being computed with the formula:

$$D_e = \sum_{i \in N_e} C(\rho_i) \times C(\overline{\rho_i})$$

where $N_e$ is a number of the one or more pairs of antipodal points, $\rho_i$ and $\rho_i$ are the pair i of the one or more pairs of antipodal points, and $C(\rho_i)$ and $C(\overline{\rho_i})$ are the values of the pair i of the one or more pairs of antipodal points;

for at least one identified pattern, the identified joint is a pivot joint, the replacing a part of the density field by a material distribution representing a joint, further comprising identifying a center of the respective region of the signed field formed by the identified pattern, the center being an element of the respective region of the signed field corresponding to an element of the detection field with the highest associated value of the detection field in the respective region, and replacing the density field in the respective region formed by the set of neighboring elements by a material distribution representing presence of material at the center of the respective region and absence of material elsewhere in the respective region;

the identifying of one or more patterns of convergence and divergence comprises detecting a bi-modal pattern in the distribution of squared divergence with respect to an angle around each element of the signed field; and/or the joint is a pivot joint, a revolute joint, a prismatic joint, or a spherical joint.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
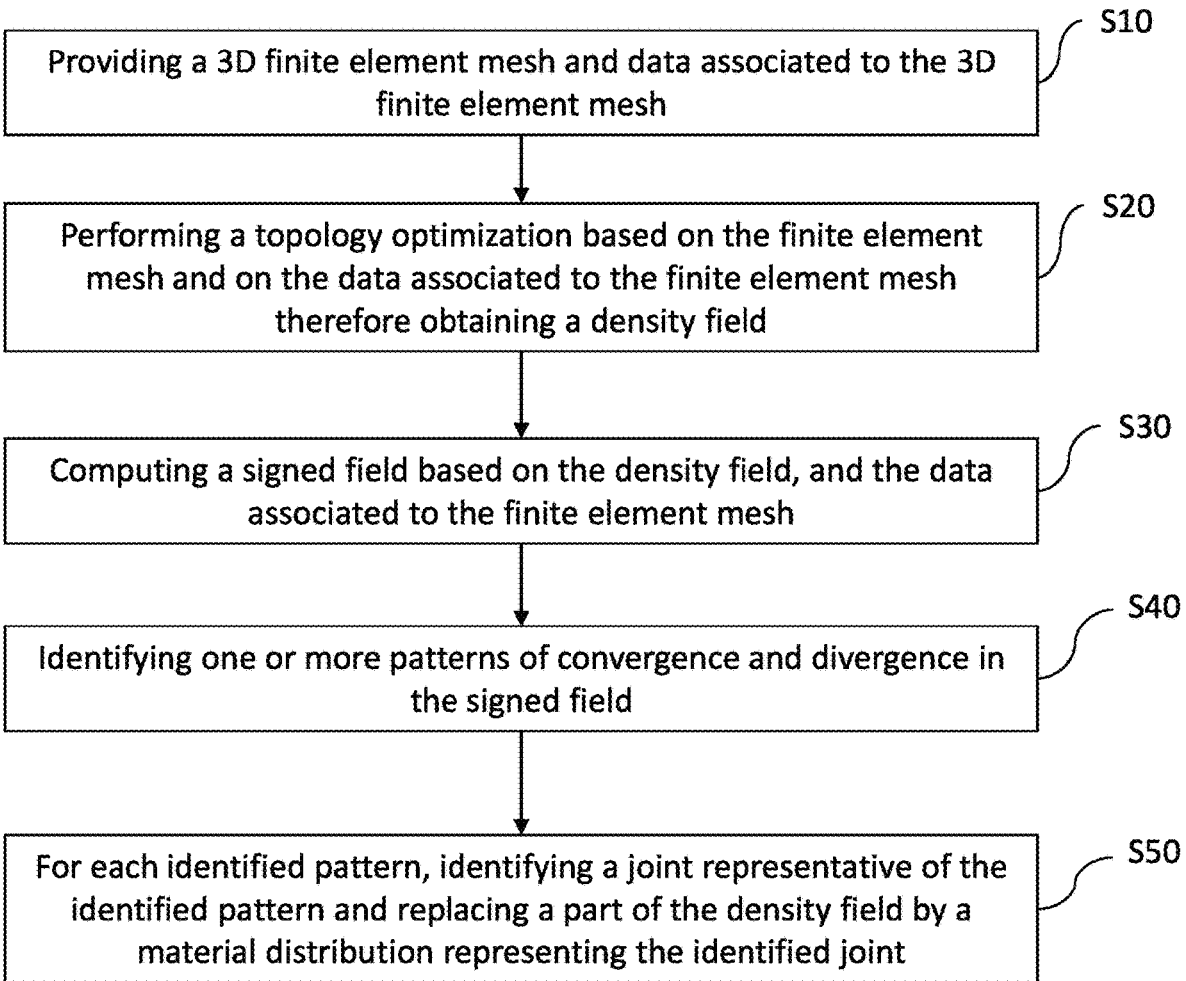
FIG. 1 shows a flowchart of an example of the method.

With reference to the flowchart of FIG. 1, there is described a computer-implemented method for designing a 3D modeled object. The 3D modeled object represents a transmission mechanism with a target 3D motion behavior. The transmission mechanism is formed in a material and comprises at least one joint. The method comprises providing (S10) a 3D finite element mesh, and data associated to the 3D finite element mesh. The data associated to the 3D finite element mesh comprises one or more input forces forming one or more respective loads case, one or more boundary conditions, one or more parameters related to the material, a (material distribution) global quantity constraint relative to a global quantity of the material in the finite element mesh, and a target 3D motion behavior. The method further comprises performing (S20) a topology optimization based on the finite element mesh and on the data associated to the finite element mesh therefore obtaining a density field. The density field represents distribution of material quantity of the 3D modeled object. The method further comprises computing (S30) a signed field based on the density field, and the data associated to the finite element mesh. The method further comprises identifying (S40) one or more patterns of convergence and divergence in the signed field. Each of the one or more patterns forms a region of the signed field. The method further comprises, for each identified pattern, identifying (550) a joint representative of the identified pattern and replacing a part of the density field by a material distribution representing the identified joint. Each replaced part of the density field corresponds to the respective region of the signed field formed by the identified pattern. In examples, each identified joint is a compliant joint and the respective material distribution of such a compliant identified joint constructs a new joint type representing the compliant identified joint.

This constitutes an improved solution for designing a 3D modeled object representing a transmission mechanism with a target 3D motion behavior. Notably, the method of topology optimization is based on the data representing conditions of use and target motion behavior of the transmission mechanism formed in a material. The data including one or more input forces and one or more boundary conditions. This improves the physical performance of the transmission mechanism in response to the input forces and applied kinematic constraints in practice. This is particularly and objectively relevant in industrial design and allows the designed 3D modeled object to be manufactured in the real world.

As known per se a transmission mechanism is a mechanism that transfers power, force, or movement from one point to another. The transmission mechanism may be mechanical transmission or a combination of mechanical transmission and other types of transmission (e.g., fluid drive transmission, electric/magnetic drive transmission). The transmission mechanism may comprise plurality, i.e., an assembly of parts, e.g., mechanical part. Each part may be equivalently referred to as an element of the transmission mechanism. An element of the transmission mechanism may be a link or linkage, or a joint. For example, the transmission mechanism may be a four-bar linkage which comprises of four links and four joints.

The method improves the design of a 3D modeled object representing a transmission mechanism by optimizing its topology using the topology optimization. Topology optimization finds an optimized solution by searching over a design space representing all possible material distribution of the transmission mechanism up to certain length scales given by the modeling setup. This improves the designed transmission mechanism compared to using a prior choice (e.g., for an initial topology of the transmission mechanism) or combinatorial techniques (for combinatorial optimization) in which the search for highest performance possible, is highly compromised by use of a priori choices for the transmission mechanism (e.g., for the type of linkage or joints of the transmission mechanism). Using of topology optimization enables the method to design a transmission mechanism by searching in a larger and continuous design space. In addition, continuity of the design space enables the use of gradient-based approaches (e.g., a smooth gradient descent) in finding the design of the transmission which are more efficient compared to discrete or meta-heuristic methods and scalable with respect to complexity of the transmission mechanism, i.e., the number of the elements of the transmission mechanism. Using the topology optimization enables the method to simultaneously design the mechanism configuration and the shape of the linkages. In addition, replacing a part of the density field by a material distribution representing an identified joint enables the method to design transmission mechanisms comprising joints between parts of the mechanism. This enables the designed mechanism by the method to be applicable in larger length scales (e.g., larger than Microelectromechanical systems (MEMS)) and larger forces. Thereby, the method provides an automatic mechanism synthesis, i.e., as the automatic creation by an algorithm of a mechanism allowing design and placement for rigid links, flexible areas, and true joints which are all potential components of real mechanisms used in practice. The method enables designing of linkages and joints of a transmission mechanism with respect to the topology, shape, and dimension suited to the forces that are to be transmitted. In other words, the method enables a concurrent optimization of all key elements of a transmission mechanism by synthesizing mechanisms that are concurrently optimized to offer the best compromise in linkage design, linkage flexibility and joint placement for given operating behavior (i.e., conditions).

Designing 3D modeled objects representing a transmission mechanism is particularly relevant in the field of manufacturing CAD, that is, for software solutions to assist design processes and manufacturing processes, whereby the objective is to produce a transmission mechanism comprising of (assemblies) of bodies and joints according to a target motion behavior. In other words, the designed transmission mechanism may seek to satisfy a target (output) motion of a second location of the mechanism given an input motion to a first location of the mechanism. As the transmission of motion in mechanical system is directly related to transmission of force and power, in yet other words, the motion of the transmission mechanism corresponds to an input force/power in the first location of the mechanism to produce an output (target) force/power in the second location. Thus, the transmission mechanism designed by the method serves to transfer movement/force/power once fabricated. Within this context, the 3D modeled object represents a manufacturing product or manufacturing object, that may be manufactured downstream to its design, for example for each identified pattern a joint representative is identified by the method. The manufacturing object may be a product, such as a part, or an assembly of parts. In such examples, the manufactured transmission mechanism may have the linkage geometries and joint properties (e.g., type and location of each joint) according to the result of the method. In other words, the method may determine linkage and joint properties of a transmission mechanism to be manufactured. For example, the method may determine the geometry of linkage(s) of said transmission mechanism based on the obtained density field and/or type and location of joint(s) of said transmission mechanism based on the identified joint representative for each identified pattern.

Figure 8:
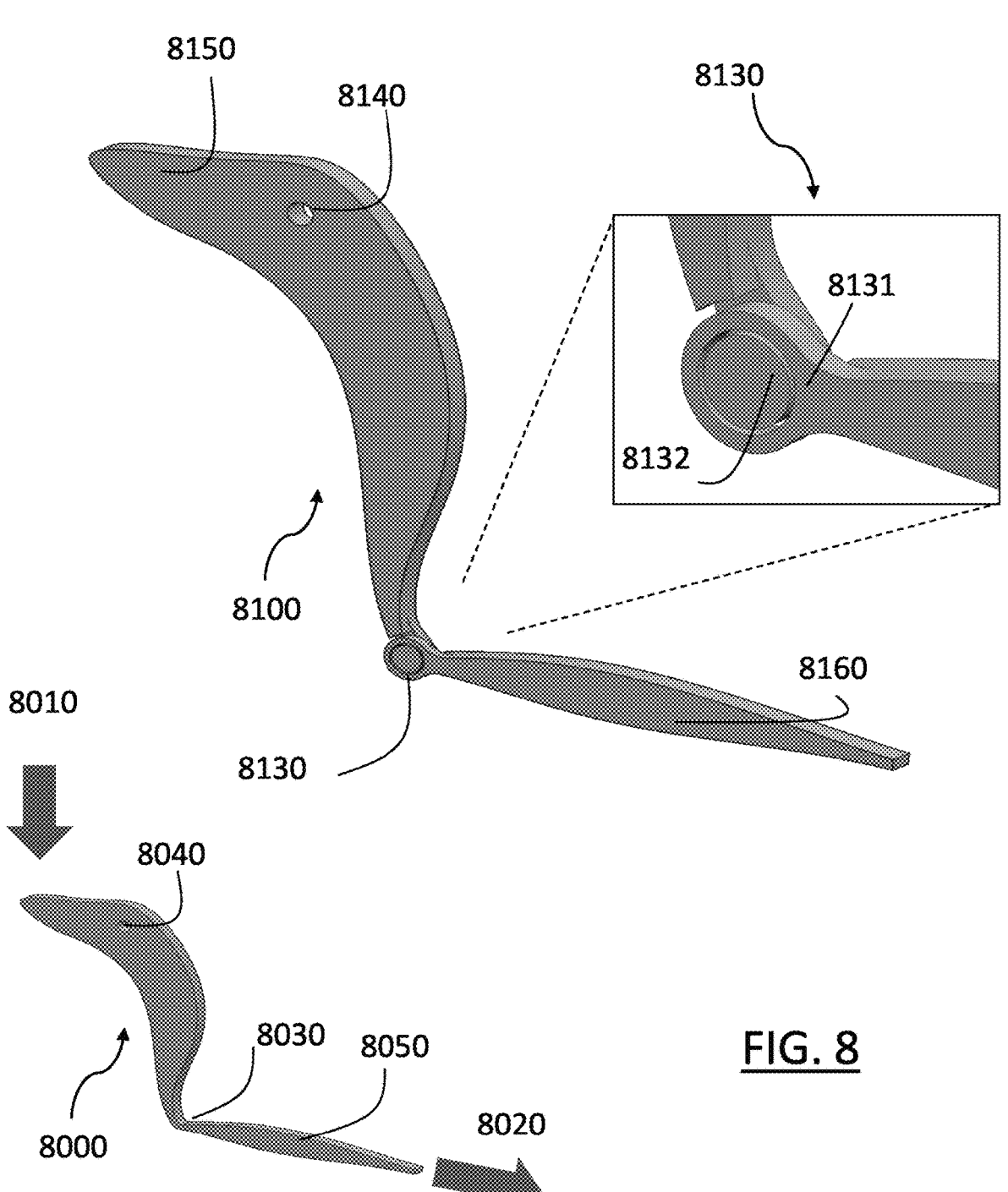

An example of such applications of the method in manufacturing CAD is now discussed in reference to FIG. 8. In this example, the method is used to design a 3D modeled object representing a transmission mechanism. The transmission mechanism is to transmit an input force 8010 to an output force 8020 with a fixed rotation axis 8040. The method may first generate a fully compliant mechanism 8000 which consists of only one part 8050 by, for example, a method of topology optimization. In the mechanism 8000, narrow flexible area 8030 serves as a compliant joint. The method then enables to identify the flexible area 8030 as a potential location for a non-compliant joint 8130 with required motion (i.e., behavior) by creating a new material distribution to obtain a mechanism 8100. The mechanism 8100 comprises two parts 8150 and 8160, one fixed rotation axis 8140, and one joint 8130; thus eliminating the need for a compliant joint. Typically, a standard ball, roller or needle bearing is mounted in the cylindrical gap between the parts. The method may further provide the geometry of the joint 8130 by determining some geometrical and topological parameters of it. For example, the method may provide one or more diameters and/or a thickness for any of the outer circle 8131 and inner circle 8132 of the joint 8130. The new mechanism 8130 obtained by the method may now be manufactured by various means including 3D printing based on the material distribution and a geometry of the joint (i.e., linkage) obtained by the method.

The method may thus be part of such a design and/or manufacturing process and may be followed by further design and/or manufacturing steps which may use notably the transmission mechanism designed by the method. These further steps may include further design and/or editions actions, tests, simulations and/or manufacturing. For example, the method may be included in a manufacturing process, which may comprise, after performing the method, producing a physical product corresponding to the modeled object. Because the method improves the design of the modeled object, the method also improves the manufacturing of a product and thus increases productivity of the manufacturing process.

The method generally manipulates modeled objects. A modeled object is any object defined by data stored e.g., in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g., representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g., mechanical) part or assembly of parts (or equivalently an assembly of parts, as the assembly of parts may be seen as a part itself from the point of view of the method, or the method may be applied independently to each part of the assembly), or more generally any rigid body assembly (e.g., a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electromechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systemes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systemes under the trademark SIMU-LIA®. Another growing CAE technique involves the modeling and analysis of complex systems composed a plurality of components from different fields of physics without CAD geometry data. CAE solutions allow the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, salespeople and buyers. A PDM solution is generally based on a product-oriented database. It allows the actors to share consistent data on their products and therefore prevents actors from using divergent data. Such PDM solutions are provided by Dassault Systemes under the trademark ENOVIA®.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object. In fact, the method designs modeled objects which are three-dimensional. The modeled object may be a modeled solid (i.e., a modeled object that represents a solid). The method is thus for solid modeling, i.e., the method yields a solid (e.g., 3D closed volume) which represents the mechanical part in 3D as it is in the real world once manufactured. The method thus belongs to the field of manufacturing CAD, as the method does output a solid representing a 3D mechanical part. The output is suitable for use in subsequent steps of a manufacturing process (e.g., further design actions, tests, simulations and/or manufacturing) as discussed above.

As discussed above, the transmission mechanism is formed in a material, for example, linkages and joints of the transmission mechanism are manufactured of the material. The material may comprise one or more elements or be anisotropic. The method may notably design 3D modeled objects representing parts manufactured of continuous fibers, for example formed in composites or laminates. Examples of such parts are parts manufactured by continuous fiber 3D printing, continuous fiber winding, or continuous fiber tape laying. Such parts are widely present in industries such as automotive, wind, aerospace and consumer goods. The transmission mechanism comprises at least a joint. In examples, the transmission mechanism may comprise more than one joints. The method comprises providing inputs of the topology optimization, for example via user-interaction.

The inputs of the topology optimization include a 3D finite element (FE) mesh or FEM. As known per se in the FE mesh comprises a mesh (i.e., a structure) of finite elements. The finite element may be equivalently referred to as "element" or "element of the mesh". The 3D FE mesh represents a space containing the modeled object to be designed. The space containing the modeled object is called the "design space". The FE mesh may be regular or irregular. A regular FE mesh allows easier computations during the topology optimization. The FE mesh may be of any type, for example with each finite element being a tetrahedron or a hexahedron (e.g., a voxel). Providing the FE mesh may comprise defining a design space and a meshing of the design space. The method may comprise displaying the FE mesh to the user, and, by the user, defining other inputs of the topology optimization, e.g., including by graphical user-interaction on the displayed FE mesh. By "graphical user-interaction" with respect to defining an element, it is hereby meant any user-interaction where the designer employs a haptic system (e.g., a mouse or a touch device such as a sensitive/touch screen or a sensitive/touch pad) to activate one or more locations of the display unit and where the element is to be positioned. Activating a location of a scene may comprise positioning thereon the cursor of a mouse or performing a touch thereon. Substantially real-time after the activation, a representation of the defined element may be displayed.

The inputs of the topology optimization further comprise data associated to the FE mesh. The associated data depend on the transmission mechanism part that the user wants to design.

The associated data include one or more parameters related to the material, in other words the data representing the material in which the transmission mechanism is formed. These material parameters may in particular represent physical characteristics of the material, e.g., characteristics of the material with respect to the physical property. The material parameters may for example relate to a constitutive law of the material with respect to the physical property. For example, the material parameter may include any physical quantity pertaining to the constitutive law. In examples, the user may specify a material (e.g., laminates and/or composites, such as woods, glass fibers, carbon fibers, ceramic matrix material or alumina matrix material), for example by selection from a list, and/or the system may determine automatically the material parameters and/or propose selection thereof to the user, for example based on one or more formulas and/or on a database. The material can be any material, for example a solid and/or isotropic material, such as a metal (e.g., steel, silver, gold, titanium), a plastic (nylon, ABS, polycarbonates, resins), a ceramic or a composite for example. The physical property may be stiffness and the constitutive law may represent the stiffness as a constitutive relation between the stress and the strain, as known per se from the field of mechanics. The stiffness may depend on the Young's moduli, on Poisson's ratio and on Shear moduli, as known per se from the field of mechanics.

The associated data may further include a global quantity constraint. The global quantity constraint is relative to a global quantity of the material in the 3D FE mesh. In other words, the global quantity constraint restricts values of the total quantity of the material in the whole 3D FE mesh. The global quantity constraint may for example be provided as a bound of the fraction of the (whole) 3D FE mesh which can be filled with the material, for example an upper bound for said fraction. Alternatively, the global quantity constraint may, rather than a bound, provide a value which has to be reached. The topology optimization may however optimize an objective function which tends to use as much material as available in the optimized result, rendering such an equality constraint equivalent to an upper bound constraint. In all cases, the fraction may be a volume fraction (also referred to as GVC in such a case, as in "Global Volume Constraint"). In other examples, the global quantity constraint may involve values representing weight of the material.

As known per se from the field of topology optimization, the associated data further include data representing conditions of use of the mechanical part and based on which the topology optimization is able to optimize the mechanical part model in view of such foreseen use.

The associated data notably include one or more input forces forming one or more respective loads. An input force may be equivalently referred to as an "actuation". In other words, the associated (digital) data include (digital) vectors (e.g., with magnitudes in Newtons or in a multiple thereof) each applicable and linked to one or more finite elements of the FE mesh. These (digital/virtual) forces represent real-world loads to which the mechanical part will be subject when used. In other words, for each one or more finite elements of the FE mesh for which a respective force is present in the data, the data represent the fact that material of the mechanical part at locations corresponding to said one or more finite elements will be subject to corresponding loads in the real-world. But since a mechanical part may theoretically be subject to an infinite number of loads, not all loads are represented by the digital forces present in the data. The digital forces only represent a restriction of the whole set of loads, for example most significant ones and/or most representative ones. The digital forces may be determined for each modeling problem and may be chosen to be the largest (i.e., highest magnitude) real-world forces the object may be subject to during its lifetime, since these real-world forces tend to cause the largest deformations and mechanical stresses. As known per se from the field of manufacturing CAD, a set of one or more real-world forces exerted at the same time may be grouped in a so-called load-case. When there exist two or more load cases, they are not necessarily applied at the same time on the mechanical part and cannot accumulate/compensate each other. An industrial problem may in examples have between one and a dozen load-cases. In examples, the user may select via graphical user-interaction finite elements of the FE mesh, and then specify a force applicable thereto. In other words, a load case may comprise a set of real-world loads/forces that act on a physical object at one time. A model can experience different load cases at different times (for example, consider a building that is subjected to gusts of wind). Thus, a digital force in the associated data may represent several real-world forces applied to the physical object at a same time, i.e., a load case.

An input force may be a mechanical actuation, i.e., a force that physically are applicable to the transmission mechanism by pushing/pulling some region(s) (i.e., to one or more finite elements of the FE mesh) of the design space. An input force may be a hydraulic or pneumatic actuation, for example with an inflatable pressure chamber embedded in the design. This is a fairly common actuation technique used in small robots. An input force may be a thermal actuation, for example the actuation resulted from thermal expansion of the material in a region of the design space. An input force may be a piezoelectric actuation, electrostatic actuation, or a magnetic actuation.

The associated data also include one or more boundary conditions. A boundary condition is a constraint on the boundary of the 3D modeled object. Each boundary condition applies and is linked to one or more finite elements of the mesh and represents a respective constraint on the boundary to which the mechanical part is subject in use. The boundary conditions may be equivalently referred to as kinematic constraints. In other words, each boundary condition represents the fact that material of the mechanical part at locations corresponding to said one or more finite elements is subject to a constraint on its displacement, for example using Dirichlet boundary conditions. An element may have its displacement constrained (among others) along a plane, along a curve, along/around an axis, or to/around a point, and/or its displacement may be only constrained only in translation, only in rotation, or in both translation and rotation. In the case of a displacement constrained to a point both in translation and rotation, the element is fixed in 3D space and is said to be "clamped". An element may however have its displacement constrained in translation along a plane but move freely on said plane (e.g., if it belongs to an object mounted on a bearing), in translation along an axis but move freely on said axis (e.g., in a piston), or in rotation around an axis (e.g., joints of a robotic arm).

In examples, the boundary conditions represent all the constrained boundaries. In other words, for each finite element of the FE mesh which is intended to eventually contain material that is constrained (e.g., to remain fixed), a boundary (e.g., clamping) condition may be associated to integrate this fact in the topology optimization. In examples, the user may select via graphical user-interaction finite elements of the FE mesh, and then specify that boundary conditions are applicable thereto.

In examples, the one or more constrained boundaries of the mechanical part comprise or consist of one or more fixed boundaries (i.e., the material at said one or more boundaries cannot move), and the corresponding one or more boundary conditions are clamping conditions.

The associated data also include a target 3D motion behavior. By "a target 3D motion behavior" it is meant an optimal transmission of movement/force/power from one point in the design space to another. Such a target 3D motion behavior designates a move from one point of the design space, according to a load case (or one or more input forces thereof) and the boundary conditions, to another point in the design space. A motion behavior also forms one or more output forces correspond to each load case. By "one or more output forces" it is meant one or more forces transmitted to one or more output locations corresponding to the application of a load case. In other words, each input force applies a force (or a motion thereof) to a region of the design space which transmitted into the desired target 3D motion behavior.

The forces and boundary conditions may be obtained by mechanical tests, for example by measuring the value of a force applied on a mechanical part on a certain area. A user, e.g., a designer, may also calculate them based on static or dynamic calculations, based on recommended values by design standards, or based on numerical simulations, as known in the field of engineering design.

The topology optimization may as widely known comprise optimizing (e.g., automatically) an objective function based on the inputs. "Based on the inputs" means that the optimizing takes into account the inputs, including the 3D finite element mesh and the data associated to the 3D finite element mesh, when performing the topology optimization. In examples, the topology optimization may take the forces and boundary conditions for a given input specification and apply them to the elements and nodes of the FE mesh. In examples where the physical property is the stiffness, the objective function may represent the compliance of the mechanical part, which is the inverse of the stiffness. The compliance encapsulates the amount of deformation of the structure considering specified load cases, output forces, and fixed boundary conditions. Therefore, when the optimizing minimizes the compliance, this corresponds to maximize the stiffness of the design for a given mass.

The topology may assemble a global stiffness matrix and solve for the nodal displacements of the structural equilibrium. In other words, the topology optimization may compute the deformation of the structure in its current state for the applied (input and output) forces and boundary conditions. This results in that the mechanical part exhibit improved stiffness performances in response to the load cases applied on it. Alternatively, the objective function may represent one or more of an output displacement, a mechanical advantage, a mechanical efficiency, and/or a geometrical advantage. In such examples, the optimizing of the objective function comprises maximizing the objective function.

Performing the topology optimization results in obtaining a density field. In other words, the topology optimization is performed among candidate material distributions. The density field represents distribution of candidate material quantity of the 3D modeled object designed, i.e., a value of volume fraction of material per finite element of the FEM. Each candidate material distribution may be a distribution (i.e., layout) of quantity (e.g., volume fraction) of material over the FE mesh, i.e., a density field. As known per se, a topology optimization may explore the candidate material distributions by varying/modifying the material quantity (e.g., volume fraction) in each element of FE mesh, as the design or free variables, to optimize the objective function. In examples, the free variable of the objective function may be directly the distribution (i.e., layout) of quantity (e.g., volume fraction) of material over the FE mesh. The objection function may depend on the material parameters (i.e., fixed variables of the objective function may involve the material parameters) and the optimization may be performed under constraint (i.e., constrained optimization), including the global quantity constraint. Each element of the FE mesh has a given relative density value defining whether it is empty or full of material, respectively defined by the values "0" and "1". Additionally, in order to make the optimization problem continuous, the general topology optimization may allow the elements to take any value between 0 and 1. This may be referred to as "relaxation". Since the interpretation of elements with intermediate densities can be ambiguous, the general topology optimization workflow may introduce the penalization approach which forces intermediate elemental densities to be globally less efficient for the structural behavior than elements with the lower and upper bound of 0 or 1, respectively. The optimization may be performed according to any algorithm known in the field, for example an iterative algorithm.

The performing of the topology optimization or the method may further comprise thresholding, i.e., filtering, the density field after performing the topology optimization. In examples where the material quantity is a volume fraction of the material, the optimization process yields a distribution of finite-element-wise material volume fractions and the topology optimization or the method may comprise a further step of filtering (e.g., automatically), that is, determining for each finite element whether it is (fully) filled with material or not based on such volume fraction distribution. For example, this may be based on a comparison with a (e.g., predetermined) threshold (e.g., higher than 0.1 or 0.2 and/or lower than 0.9 or 0.8, e.g., of the order of 0.5), a finite element being considered as fully filled with material (respectively totally empty) if the volume fraction resulting from the optimization is higher (respectively lower) than the threshold. The method may in examples further comprise computing (e.g., automatically) a 3D modeled object, such as a boundary representation (B-Rep) model, based on the result. For example, the method may compute swept volumes based on and along series of finite elements resulting from the optimization and/or the filtering. The output of the topology optimization is the geometry of the optimized design which satisfies (i.e., complies) as much as possible with the input specifications.

The computed signed field is based on the density field, and the data associated to the finite element mesh. By "based on" it is meant that the computing takes into account the inputs, including the 3D finite element mesh and the data associated to the 3D finite element mesh. The signed field is computed on the finite element mesh, i.e., the computed signed field is associated to the FE mesh. By being associated to the FE mesh it is meant the signed field is computed with respect to the FE mesh, for example for each element of the FE mesh or edges and/or vertices of the element.

As discussed above, the method further identifies one or more patterns of convergence and divergence in the signed field. Each pattern is a pattern constituted by contour lines of the signed field and forms a region of the signed field respective to the pattern. Each formed region may comprise one or more elements on the FE mesh. By "pattern of convergence and divergence" it is meant that diverging (i.e., moving away from each other) and converging (i.e., moving towards each other) pattern of the contour lines of the computed signed field. The convergence may imply the compression in the respective region while the divergence may imply the tension. In other words, the convergence may imply that the material in the respective region of the pattern is being pressed while the divergence may imply dilation of the material in the respective region of the pattern.

The method further identifies a joint representative of the identified pattern for each identified pattern in the computed field and replace a part of the density field by a material distribution representing the identified joint. In other words, the method updates a part of the density field (obtained by the topology optimization) such that the updated density field in said part represents the identified joint. The replaced part corresponds to the respective region of the signed field formed by the identified pattern. In examples, the respective region may be equal or a subset of the one or more finite elements of the formed region. In examples, each identified joint is a compliant joint and the respective material distribution of such a compliant identified joint constructs a new joint type representing the compliant identified joint.

In examples, the method may compute the signed field by performing a finite element analysis (FEA) based on the density field, the finite element mesh, and the data associated to the 3D finite element mesh therefore obtaining a displacement field on the finite element mesh. The method may then compute the signed field from the density field and the displacement field. The displacement field may be associated (corresponding) to the density field.

The signed field may be a scalar field. The computing of the signed field may further comprise computing a strain from the displacement field. The signed field may be a scalar field on the FE mesh. The signed field may comprise, for each element of the signed field a value being equal to a value of the computed strain, and a sign being equal a sign of a dilation of the computed strain. By "element of the singed field" it is meant the respective finite element of the FE mesh in association to the computed signed field.

For each element e of the FE mesh the scalar field may take the value of the computed elemental strain:

$$\rho_e \times u_e^T K_e u_e$$

where $\rho_e$ is the value of the density field at the element e, $u_e$ is the obtained displacement at the element e, and $K_e$ is a local stiffness matrix at the element e. The sign of the signed field may be in accordance with the sign of dilation. In other words, the sign of the signed field at element e may be positive if the element is under compression (i.e., its volume decreases under loading) and negative if the element is under tension (i.e., its volume increases under loading).

The method may smooth the signed field by a smoothing filter such as a Gaussian filter. The Gaussian filter may be defined as known in the field and with a filtering of size sigma with respect to the FE mesh, for example a size equal to two finite elements (e.g., two voxels). As known, the sigma is the standard deviation of the Gaussian filter. This smoothing step improves the solution by avoiding high frequency perturbations in the field, especially on coarse finite element meshes.

In examples, the identifying of one or more patterns of convergence and divergence may comprise computing a detection field from the computed signed field. The detection field may comprise elements such that each element of the detection field corresponds to one element of the signed field. The detection field may be scalar field. Each element of the detection field may represent a local distribution of the values of the computed signed field, i.e., an element of the detection field may represent the distribution of the values of the computed signed field in a neighborhood around the element. In examples, a detection filter which is adapted for a joint type may be used for selecting values of the computed signed field that are representative of the local distribution. Each value of the computed signed field is associated to an element of the FE mesh, i.e., the method may use the detection filter to define the neighborhood around the element. By "adapted for a joint type" it is meant that a detection filter may be adapted to select the values representative for a particular type of joint. In examples, the detection filter may be adapted to more than one type of joint. In such example the detection filter may be able to distinguish between the types of joints been adapted to, for example by distinguishing between a revolute/hinge and spherical/ball bearing joint.

The method may identify the joint by performing the method for different load case. In such examples, the method may compute the detection field for each member of a solution set. The solution set is a set comprising the results of performing the method for each load case. The method may further comprise comparing the computed signed fields and/or identified pattern for each load case. Using the solution set enables the method to distinguish between different types of joints.

The identifying of one or more patterns of convergence and divergence may further comprise determining elements of the computed detection field which has a respective associated value not respecting a threshold value, thereby to determine a subset of the element of the detection field. The threshold, i.e., the detection threshold may be set according to the joint type. The detection threshold may be set as a percentage of the maximum (absolute) value of the detection field D, for example a value between the $0.1*\max(-D)$ and $0.5*\max(-D)$, or $0.3*\max(-D)$, where $\max(-D)$ is the maximum value of the detection field D. The determined elements may have a value below the value of the threshold.

The identifying of one or more patterns of convergence and divergence may further comprise identifying one or more patterns of convergence and divergence in the determined elements (i.e., the subset) of the computed detection field. Each of the identified one or more patterns of convergence and divergence in the determined elements of the computed detection field may comprise a set of neighboring elements of the determined elements and form the respective region of the signed field formed by the identified pattern.

Alternatively, the identifying of one or more patterns of convergence and divergence may comprise detecting a bi-modal pattern in the distribution of squared divergence with respect to an angle around each element of the signed field.

In examples, the selecting (by the detection filter of) values of the computed signed field that are representative of the local distribution may comprise selecting two or more elements of the signed field. The two or more elements of the signed field are located in a neighborhood of the element of the signed field for which a detection field is computed. As discussed above, such a neighborhood is defined using the detection filter. In examples, the method may sweep (i.e., explore) the whole design space or only where the respective value of density field is larger than a threshold (e.g., where the material is present). Alternatively or additionally, the method may compute a smoothed squared divergence map, and examine only areas where this map (which contains both positive and negative divergence) has highest values. The computing of the smoothed squared divergence map improved the computational efficiency of the selecting by only considering certain candidate regions where the divergence field is bumpy (i.e., oscillatory).

The selecting of two or more elements of the signed field may further comprise identifying two or more elements of the signed field intersecting a sphere centered on the element of the signed field for which the detection field (D) is computed. In other words, the method may select the elements of the FE mesh which has overlap with the sphere, i.e., lies completely or partially inside the sphere. In some examples, the sphere may have a radius larger than a length-scale value used for the performing a topology optimization. By the length-scale of the topology optimization it is meant a length scale parameter that defines the minimum allowed size of geometrical features in the density field, for example the topology optimization may only allow a structural beam to be thicker than a number of voxels (e.g., three voxels). The radius of the detection filter may represent the expected size of the joints to be detected in the density field. In such examples, the filter radius twice as large as the length-scale. Alternatively, the filter radius may be half or equal to the length-scale.

The selecting two or more elements of the signed field may further comprise setting one or more pairs of antipodal points of the signed field located on the sphere. Each pair of antipodal points belongs in a respective pair of antipodal elements. Each point of a pair of antipodal points has a value of the computed signed field of its respective element. The antipodal points may be located on the surface of the sphere. The antipodal point pairs p and p may be evenly distributed according to a spherical Fibonacci spiral in 3D. The computing of a detection field from the computed signed field may further comprise computing a sum of pairwise products of the respective values of the antipodal points where the sum is computed with the formula:

$$D_e = \sum_{i \in N_e} C(\rho_i) \times C(\overline{\rho_i})$$

where $N_e$ is a number of the one or more pairs of antipodal points, $\rho_i$ and $\rho_i$ are the pair i of the one or more pairs of antipodal points, and $C(\rho_i)$ and $C(\overline{\rho_i})$ are the values of the pair i of the one or more pairs of antipodal points. Here, $D_e$ is the respective value of the detection field for the element e.

In examples, for at least one identified pattern, the identified joint is a pivot joint. In such examples, the replacing a part of the density field by a material distribution representing a joint may further comprise identifying a center of the respective region of the signed field formed by the identified pattern. The center may be an element of the respective region of the signed field corresponding to an element of the detection field with the highest associated value of the detection field in the respective region. The replacing a part of the density field by a material distribution representing a joint may further comprise replacing the density field in the respective region formed by the set of neighboring elements by a material distribution. The material distribution may represent presence of material at the center of the respective region and absence of material elsewhere in the respective region. The center of the identified region may be the center of the compliant (flexible) joint of the transmission mechanism. In other words, when the center of the respective region is identified, the geometry of in a neighborhood of the center (disk in 2D or sphere in 3D) is modified by the geometry of an explicit (rigid) joint. The method may realize such a modification by replacing (i.e., modifying) the corresponding density field in the respective region representing the identified (rigid) joint.

In examples, the joint may be any of a pivot joint, a revolute joint, a prismatic joint, or a spherical joint.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 9:
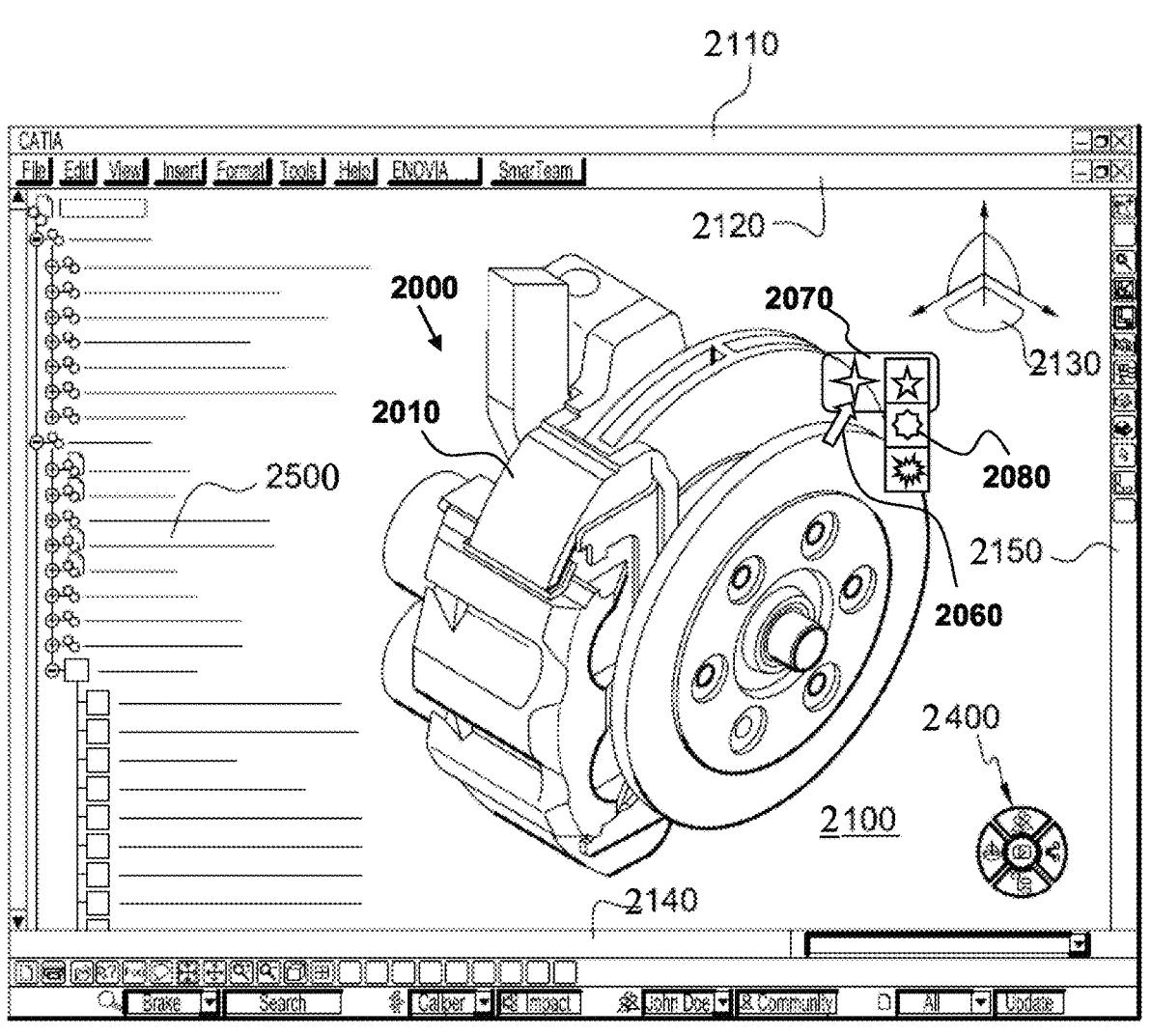
FIG. 9 shows an example of a graphical user interface of the system.

FIG. 9 shows an example of the GUI of the system, wherein the system is a CAD system. The model 2000 is an example 3D modeled object designed by the method.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g., change the dimension, color, etc.) or edit geometrical constraints by selecting an appropriate icon. For example, typical CAD operations are the modeling of the punching, or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 10:
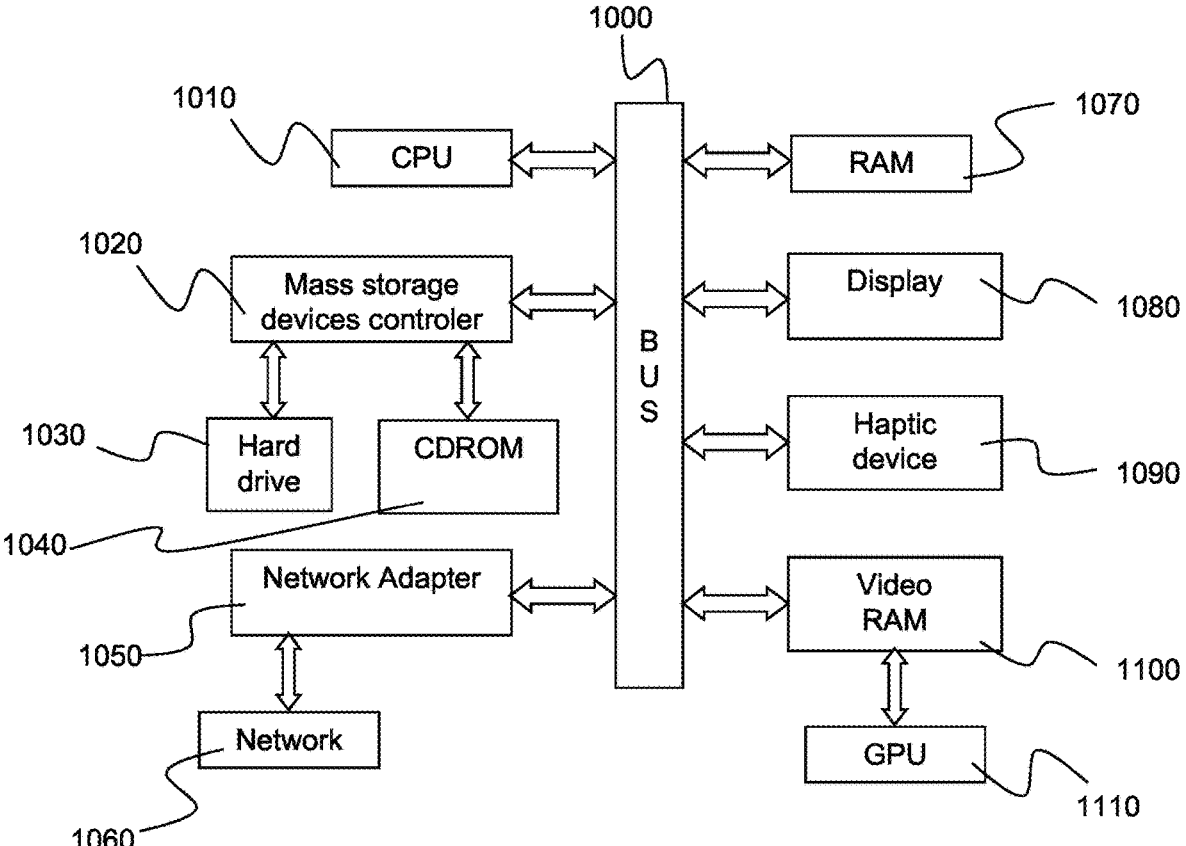
FIG. 10 shows an example of the system.

FIG. 10 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Implementations of the method are now discussed.

Starting from a neutral design space, seen as either empty or filled with some uniform matter, and objectives on an optimal transmission of movement going from one point in the design space to another, the implementations provide a continuous solution path leading to the creation of an optimized mechanism with joints. A typical application of the implementations is the design of an industrial robot.

The implementation starts with performing a topology optimization of compliant mechanisms to obtain a flexible joint mechanism. After, the implementations apply a joint detection technique to identify the locations where the flexible structure is behaving like a joint and to replace a true mechanical joint at that location. The result is a jointed structure with optimized universal dimensions and connectivity.

The implementations are able to use the topology optimization techniques in the prior art and to perform a mechanism synthesis avoiding the drawbacks of a prior search, combinatorial optimization and being restricted small length scales and/or subjected to very low forces of compliant mechanisms. The implementations further allow for inclusion of optimality criteria due to the smooth gradient descent used to converge to the final configuration. This improves the computational performance and general planar mechanisms may be synthesized in only a few minutes, with simultaneously discovered both the mechanism configuration and the shape of the linkages. The implementations perform automatic mechanism synthesis, i.e., automatic creation by an algorithm a mechanism allowing for rigid links, flexible areas, and true joints which are all potential components of real mechanisms. The approaches in the prior art fail to include the design and/or placement of one or more of those elements. Furthermore, the implementations obtain linkages created with topology, shape and dimension suited to the forces that are to be transmitted. Concurrent optimization of all key elements of a system (i.e., mechanism), for the most complete set of operating conditions possible, is a recognized goal of engineering design. The implementations are able to synthesize mechanisms that are concurrently optimized to offer the best compromise in linkage design, linkage flexibility and joint placement for given operating conditions.

Figure 2:
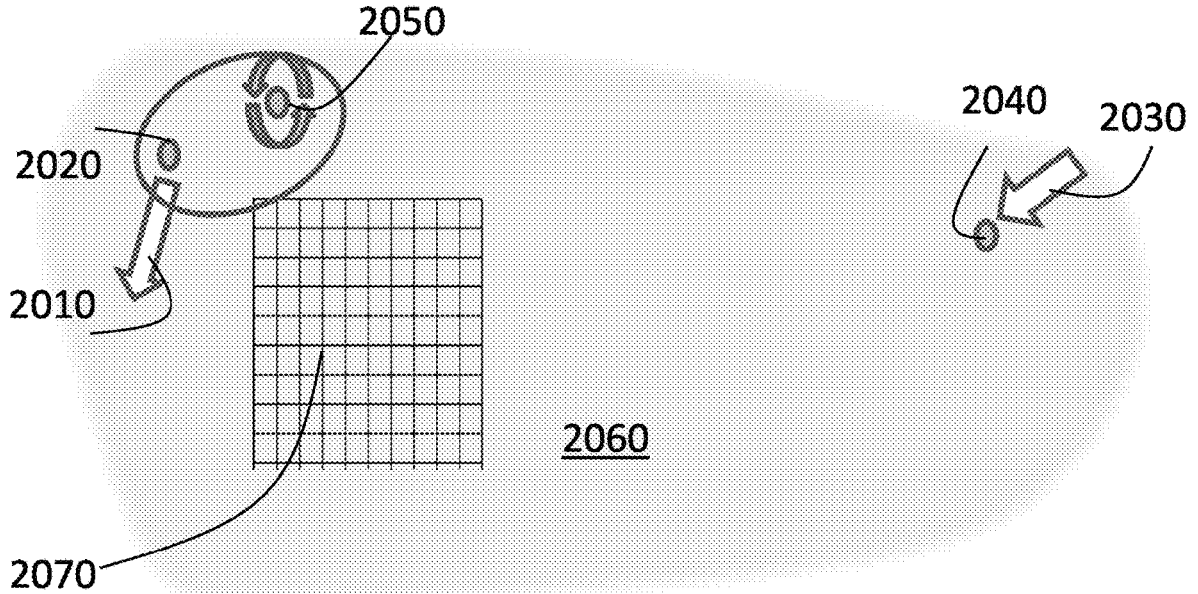
FIGS. 2, 3, 4 and 5 present a schematic of an application of the method to design a transmission.

In reference to FIG. 2, the implementations create a lever mechanism type that receives an input actuation (force) 2010 at given location 2020 and is required to produce a resultant force output 2030 at another location 2040, i.e., a desired reaction force output, and for given directions. The input force 2010 is in association with a pivot 2050 to produce the actuation. The objective is to transmit the work (or movement) done by the actuation over to a different point and direction as efficiently as possible. Design domain 2060 is a continuous field of force, displacement and material density distribution (or layout), sampled on a grid 2070 for computational synthesis. The grid 2070 may cover all the design domain 2060.

The implementations provide a reliable means of detecting the flexible parts of the design that are in fact pseudo-joints, i.e., candidates to be replaced by a true joint. The implementations perform this detection by identifying and detecting a characteristic tension-compression pattern near the joint location.

Figure 3:
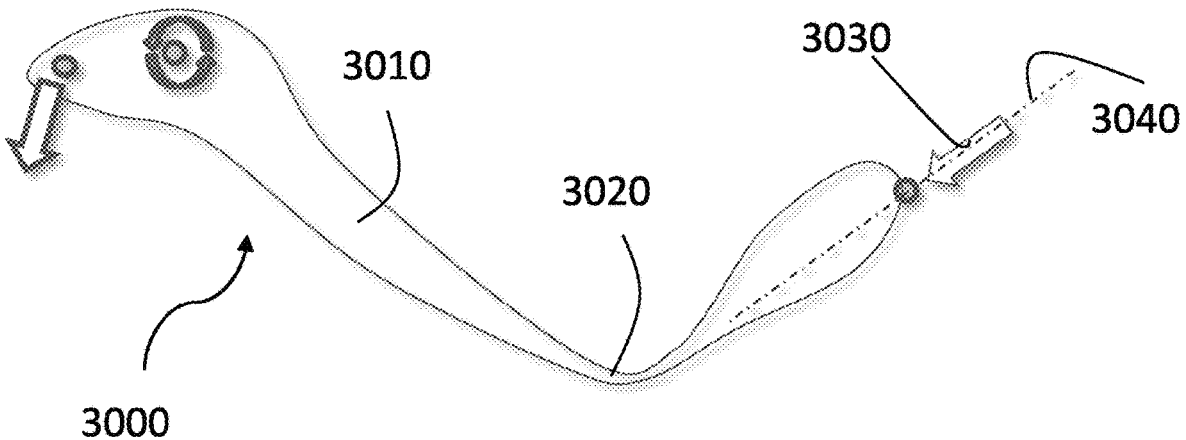
Figure 4:
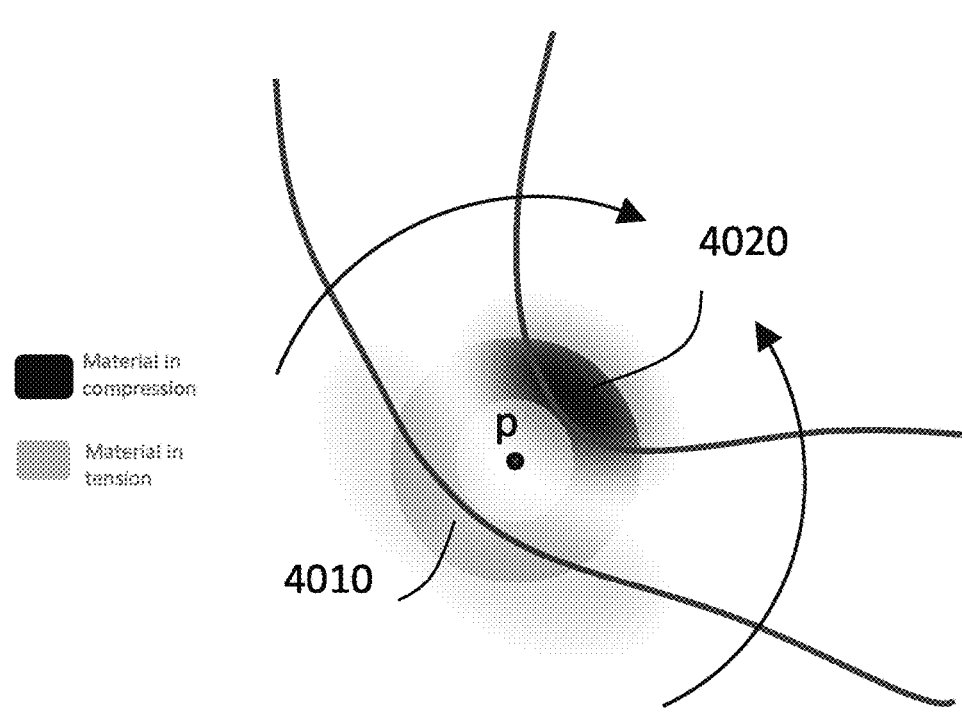

In reference to FIG. 3, the topology optimization provides a material density field ρ and a displacement field u for the primal solution of the lever mechanism 3000. In other words, the density field describes the presence/absence of material for each volume element (voxel) in space whereas the displacement field describes the displacements for each element corner (node) of the structure under the applied loading. This involves solving for the displacements u in the state equation $K(\rho)u=f$ where K and f are the known stiffness matrix and force vectors, respectively. The topology optimization works by moving material around continuously in the design space. It naturally discovers that by creating a part of the design having a narrow geometrical layout of the material distribution then it thereby creates the functionality of a joint, in the correct location, but until now not recognized as a true joint in a kinematic sense. The mechanism 3000 has rigidity areas 3010 appear for high stiffness movement transmission, as well as narrow and flexible area 3020 which acts as pivot joint. The mechanism 3000 provides an output reaction force 3030 produced for appropriate direction 3040, but performance is not ideal due to flexible joint. A close-up of the area 3020 is presented in FIG. 4 in which region 4010 displays the region in which the material is in tension, while the material in region 4020 is in compression.

The implementations, calculate a signed scalar field C from the displacement field and the density field. The signed scalar field describes the local convergence/divergence of the compliant structure. For each element e the scalar field takes the value of the elemental strain, i.e., $$\rho_e \times u_e^T K_e u_e($$

which is a positive quantity) and its sign is based on the change in volume of the element. The sign is set to positive if the element is under compression (its volume decreases under loading) and negative if the element is under tension (its volume increases under loading). Optionally, the implementations may smooth the field using a Gaussian filter of size sigma equal to two voxels. This smoothing step helps avoiding high frequency perturbations in the field, especially on coarse finite element meshes.

The implementations then study the convergence/divergence field behavior by sweeping it with a circular (or spherical in 3D) detection filter. The radius of this filter is set to be equal to the minimum length-scale value used by the preliminary topology optimization. This is the natural choice since the minimum length-scale value typically used in topology optimization puts a bound on the geometrical size of the smallest features.

For each element, the implementations may use a simple detection strategy which is to calculate the sum of pairwise products of antipodal points on the perimeter (or surface in 3D) of the filter, as it will be highest when centered at the joint. Effectively, the value of the detection field D for each element e is $D_e = \Sigma_{i \in N}$, $C(\rho_i) \times C(\overline{\rho_i})$ where the set of N antipodal point pairs p and $\overline{p}$ are evenly distributed along the perimeter of the circle in 2D or distributed using a spherical Fibonacci spiral in 3D. In some variations, the implementations may use a more sophisticated approach will be to study the distribution of squared divergence versus angle around the point, which should be bi-modal (sum of two Gaussians). The implementations may any of known accepted statistical tools to detect bimodality. In this case, the implementations may detect a joint at the locations where the bimodality indicator is strongest compared to the rest of the structure. The detection step enables the method to detect the pattern, i.e., the pattern of positive and negative convergence going around a central voxel.

After detecting the pattern, the implementations locate the exact position and axis of rotation of each pivot joint. The position is the voxel with highest detection filter score within each connected component above a certain threshold. The implementations may set the threshold to 0.5 in a normalized detection field. The axis of the pivot joint follows the pair of antipodal points contributing the most to this score.

The implementations may improve computational expense of the search (i.e., sweep) as only high-density locations (i.e., locations with high value of the density field representing distribution of material quantity) or their close neighbors are candidates for being joints. Further, the implementations may compute a smoothed squared divergence map, and examine only areas where this map (which contains both positive and negative divergence) has highest values. In practice, transmission mechanisms typically have few joints so generally the implementations are computationally inexpensive.

Figure 5:
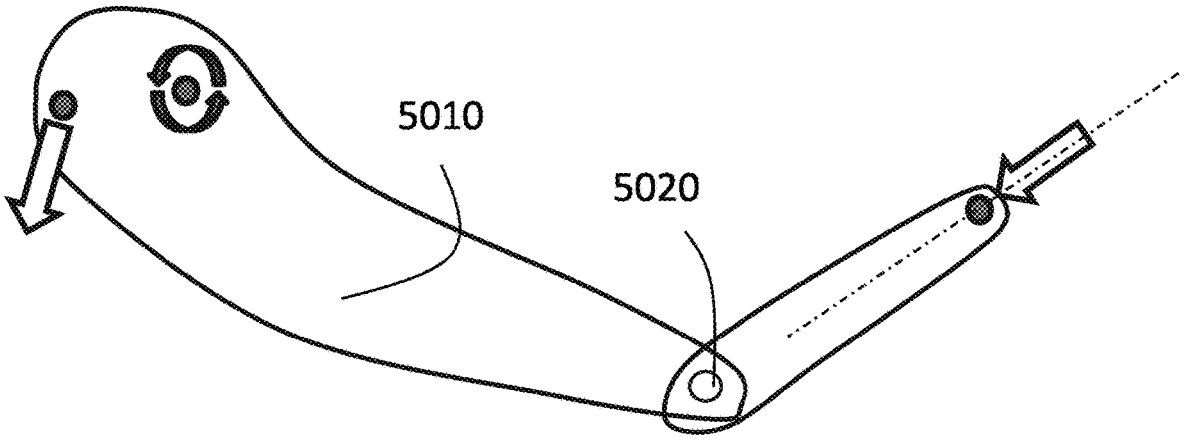

Further, the implementations obtain the mechanism with joints by replacing the flexible areas by the correct joint constructor. This is illustrated in FIG. 5 where the flexible area (3020 in FIG. 3) is replaced by a pivot joint 5020 and arm 5010 is now a component of very high rigidity (stiffness) component. The implementations may synthesize the transmission mechanisms in 2D by synthetizing joints in 2D, for example where only kind of joint considered is a pivot joint. In a 3D implementation, the equivalent of the pivot is a revolute joint, and further joint types may be considered, as discussed below.

Prototype Implementation

Figure 6:
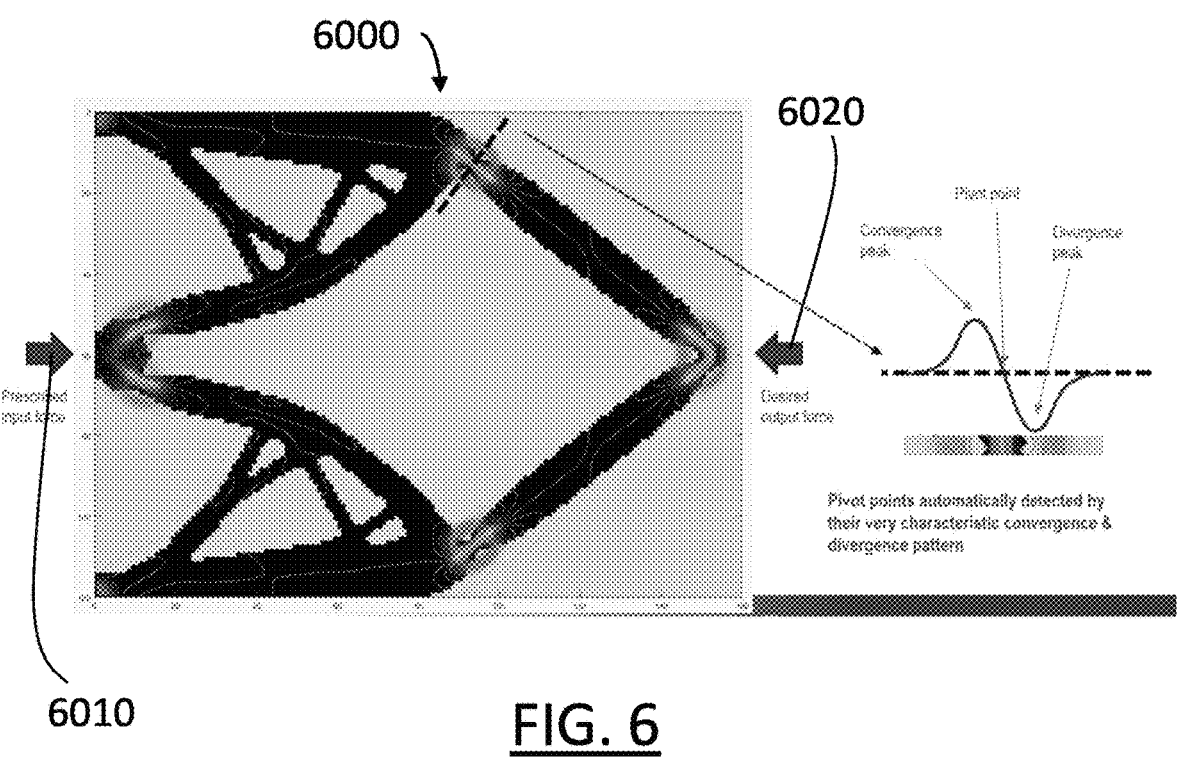
FIGS. 6, 7 and 8 present an implementation of the method to design a 2D force inverter.

A prototype implementation of the method is now discussed in reference to FIG. 6. The implementation performs the mechanism synthesis by the described method for a 2D compliant mechanism obtained using linear (small displacement) topology optimization. The exact implementation of the prototype implementation follows these steps:

1. Topology optimization of a force inverter 6000 compliant mechanism using linear analysis (for a prescribed input force 6010 and a desired output force 6020).
2. Thresholding of the resulting optimized density field to obtain a binary density field. The binary density field $\rho$ is set to 1 where the optimized density field is above a chosen threshold (in the implementation 0.5), and 0 otherwise.
3. Finite element analysis of the thresholded density field (i.e., the result of step 2) using the same loads and boundary conditions as in the initial topology optimization to obtain the nodal displacements. This involves solving for the displacements u in the state equation Ku=f where K and f are the known stiffness matrix and force vectors, respectively.
4. Computation of a signed convergence field. For each element e the convergence field take the value of the elemental strain:

$$\rho_e \times u_e^T K_e u_e.$$

The sign of the convergence field is set to positive if the element is under compression (its volume decreases under loading) and negative if the element is under tension (its volume increases under loading).
5. Smoothing of the signed convergence field using a Gaussian filter. This step helps avoiding high frequency perturbations in the field, especially on coarse finite element meshes.

6. Sweep the convergence field C with the pivot detection filter to build the detection field D. The filter sums a pairwise product of convergence values for antipodal points along the perimeter of a circle for a chosen radius R. In the implementation R is the size of 3 voxels in accordance with the minimum length-scale value of the initial topology optimization and is the same for every voxel.

Figure 7:
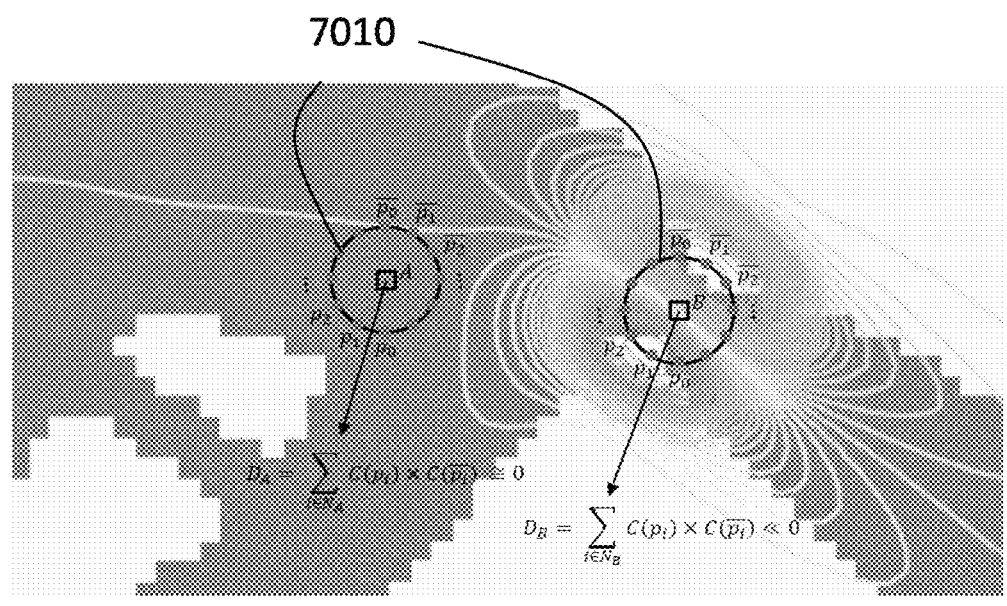

As illustrated in FIG. 7, the detection filter sweeps through the entire design space. For clarity it is only drawn over two different voxels A and B. The pairs of antipodal points 7010 contributing to the detection score of those two voxels are also displayed. The detection field resulting from these steps will have a strong negative value peak on the ideal pivot location (in this case on voxel B) and be close to zero everywhere else (for example on voxel A). Moreover, the values of the pairwise products indicate along which pair of antipodal points the pivot is acting (in this case the pair $(p_1; \overline{p_1})$).

Detecting Multiple Joint Types

The implementations may distinguish joints that involve linear sliding motion, from those which involve only rotations. In 2D, sliding motion yields only one type of joint, a slider. In 3D, three kinds of sliding joints can exist: planar slider, prismatic joint and cylindrical joint. Concerning rotational joints, in 2D, the implementations consider a pivot joint as discussed above as the only type needs to be considered. In 3D, the category of joints involving only rotations includes two joint types, the revolute and the spherical. The revolute offers only one degree of freedom for rotation and also known as a hinge joint. The spherical joint, also known as a ball joint, offers three degrees of freedom: two angular movements as well as twisting around its axis.

An implementation of the method in order to detect a revolute or spherical joint is now discussed.

Firstly the implementation applies the steps 1-5 of the prototype implementation discussed above, with no change as they are identical in 2D and 3D. Then, in the step 6, the implementation replaces the pivot detection circle with a sphere. The implementation then proceeds to sweep through every voxel in the 3D volume (as done 2D space in the prototype implementation), and applies the detection filter, which sums the pairwise product of the convergence values for the antipodal points. The antipodal points are evenly distributed on the surface of the sphere. The implementation detects the presence of a joint in the same manner of the prototype implementation in 2D, by identifying the locations that yield a peak in the filter value. Then, at these locations, the implementation executes the following steps:

a. Search for the pair of antipodal points $(p_1; \overline{p_1})$ on the joint detection sphere having the most strongly negative product.
b. Sweep the sphere with a set of evenly spaced discs going through $(p_1; \overline{p_1})$. For each disc, apply the 2D filter described for the prototype implementation, which computes the sum of pairwise products of convergence values at the antipodal points.
c. Identify the disc with the maximum negative value sum for previous step. This is recorded as the best-fit plane of rotation for a revolute joint at the given location and for the given finite element analysis.

The process described so far described for the 3D case is similar to the 2D case except for the appearance of the best-fit plane of rotation at the joints. The deformation field in 3D allows detecting revolute joints, because the small increment for the motion informs only of rotation in one plane. However, real world structural or mechanism optimization problems always include multiple load cases and/ or a nonlinear formulation that proceeds through several time steps. Each load case and/or time step yields a different solution in Finite Element Analysis of the step 3 of the prototype implementation as discussed above. The implementations may obtain more information about joints than one isolated solution by using a set of solutions, thus, obtained as the "solution set". The solution set allows to distinguish between different types of joints, in particular revolute and spherical joints.

An implementation of the method to distinguish between different types of joints, in particular revolute and spherical joints is now discussed as follows:

1) Perform the full joint identification process as detailed above for each convergence field in the solution set. The joint locations identified should be close to identical across the solution set, as they correspond to the same optimized shape where the bending or twisting movement has been concentrated locally in narrow and thin areas.

2) For each joint location, the implementation compares the angular variance of best-fit plane of rotation over all the solutions in the solution set. If for a given joint the variance is small (below a certain threshold) then the implementation identities the joint as revolute. If the variance is above the threshold, it means that there is significant twisting and the implementation identifies it as spherical.

As an extension, and in some variations, the implementation may also specify desired behavior of joints that do not exactly fit the behavior of one predefined specific type. As in the implementation the entire design is first seen as entirely compliant and then the compliance is removed as needed by replacing with identified joints, thus the implementation may conserve a small degree of compliance where needed to model the desired joint motion. In examples, the implementation may specify a joint such as a suspension bushing that has some compliant behavior constructed to absorb noise and vibrations, or a joint like the human knee that rotates freely in one direction and only slightly in the other direction having a high stiffness.

Freedom of Actuator Location

The implementations are compatible with methods topology optimization introducing simultaneous topological design of the host structure and optimal embedded placement of linear actuators. Such methods may be performed as known in the art, for example according to the document Wang et al, "*Topological design of compliant smart structures with embedded movable actuators*", Smart Materials and Structures; 23(4), 2014 which is herein incorporated by reference. In the approach of these methods the actuator is modeled as a free-moving rod-like object inside the design space, and the optimization is free to place the actuator wherever its action is most useful. In some implementations of the method, such an approach may replace the standard topology optimization of compliant mechanisms. Such a replacement has two significant benefits:

a) Increased applicability of the implementations, because many practical mechanisms have embedded actuators, for example, the hydraulic rams on a digger machine.

b) Detection of sliding joints as these are often located in the actuator itself (for example between the cylinder and the piston of a hydraulic ram, or via a screw or belt mechanism for an electric actuator). For the present approach discussed, the actuator is a freely placed link that varies its length when actuated, and from this the implementations can identify an assembly comprising a sliding joint driven by one of the above-mentioned means.

The invention claimed is:

1. A computer-implemented method for designing a 3D modeled object representing a transmission mechanism with a target 3D motion behavior, the transmission mechanism being formed in a material and having at least one joint, the method comprising:

obtaining a 3D finite element mesh;

obtaining data associated to the 3D finite element mesh including:

one or more input forces forming one or more respective loads case, one or more boundary conditions, one or more parameters related to the material, a global quantity constraint relative to a global quantity of the material in the 3D finite element mesh, and a target 3D motion behavior;

performing a topology optimization based on the 3D finite element mesh and on the data associated to the 3D finite element mesh therefore obtaining a density field, the density field representing distribution of material quantity of the 3D modeled object;

computing a signed field (C) based on the density field, and the data associated to the 3D finite element mesh;

identifying one or more patterns of convergence and divergence in the signed field, each of the one or more patterns forming a region of the signed field; and for each identified pattern, identifying a joint representative of the identified pattern and replacing a part of the density field by a material distribution representing the identified joint, each replaced part of the density field corresponding to the respective region of the signed field formed by the identified pattern.

2. The method of claim 1, wherein the performing of the topology optimization further includes thresholding the density field after performing the topology optimization.

3. The method of claim 2, wherein the computing of the signed field (C) further comprises:

performing a finite element analysis based on the density field, the 3D finite element mesh, and the data associated to the 3D finite element mesh therefore obtaining a displacement field on the 3D finite element mesh; and computing the signed field (C) from the density field and the displacement field.

4. The method of claim 1, wherein the joint is a pivot joint, a revolute joint, a prismatic joint, or a spherical joint.

5. The method of claim 1, wherein the computing of the signed field (C) further comprises:

performing a finite element analysis based on the density field, the 3D finite element mesh, and the data associated to the 3D finite element mesh therefore obtaining a displacement field on the 3D finite element mesh; and computing the signed field (C) from the density field and the displacement field.

6. The method of claim 5, wherein the computing of the signed field (C) further comprises computing a strain from the displacement field, the signed field (C) including, for each element of the signed field (C):

a value being equal to a value of the computed strain, and a sign being equal a sign of a dilation of the computed strain.

7. The method of claim 6, wherein the computing of the signed field (C) further comprises smoothing the signed field (C) by a smoothing filter being one of a group including a Gaussian filter.

8. The method of claim 7, wherein the identifying one or more patterns of convergence and divergence further comprises:

computing a detection field (D) from the computed signed field (C), the detection field (D) including elements, each element of the detection field corresponding to one element of the signed field, each element of the detection field representing a local distribution of the values of the computed signed field (C), a detection filter adapted for a joint type being used for selecting values of the computed signed field (C) that are representative of the local distribution;

determining elements of the computed detection field (D) having a respective associated value not respecting a threshold value; and identifying one or more patterns of convergence and divergence in the determined elements of the computed detection field (D), each of the identified one or more patterns of convergence and divergence in the determined elements of the computed detection field (D) having a set of neighboring elements of the determined elements and forming the respective region of the signed field formed by the identified pattern.

9. The method of claim 6, wherein the identifying of one or more patterns of convergence and divergence further comprises:

detecting a bi-modal pattern in the distribution of squared divergence with respect to an angle around each element of the signed field.

10. The method of claim 6, wherein the identifying one or more patterns of convergence and divergence further comprises:

computing a detection field (D) from the computed signed field (C), the detection field (D) including elements, each element of the detection field corresponding to one element of the signed field, each element of the detection field representing a local distribution of the values of the computed signed field (C), a detection filter adapted for a joint type being used for selecting values of the computed signed field (C) that are representative of the local distribution;

determining elements of the computed detection field (D) having a respective associated value not respecting a threshold value; and identifying one or more patterns of convergence and divergence in the determined elements of the computed detection field (D), each of the identified one or more patterns of convergence and divergence in the determined elements of the computed detection field (D) having a set of neighboring elements of the determined elements and forming the respective region of the signed field formed by the identified pattern.

11. The method of claim 10, wherein for at least one identified pattern, the identified joint is a pivot joint and the replacing a part of the density field by a material distribution representing a joint, further comprises:

identifying a center of the respective region of the signed field formed by the identified pattern, the center being an element of the respective region of the signed field corresponding to an element of the detection field with the highest associated value of the detection field in the respective region; and replacing the density field in the respective region formed by the set of neighboring elements by a material distribution representing presence of material at the center of the respective region and absence of material elsewhere in the respective region.

12. The method of claim 10, wherein the selecting, by the detection filter of, values of the computed signed field (C) that are representative of the local distribution further comprises:

selecting two or more elements of the signed field (C), the two or more elements of the signed field (C) being located in a neighborhood of the element of the signed field (C) for which a detection field (D) is computed.

13. The method of claim 12, wherein the selecting two or more elements of the signed field (C) further comprises:

identifying two or more elements of the signed field (C) intersecting a sphere centered on the element of the signed field (C) for which the detection field (D) is computed, the sphere having a radius larger than a length-scale value used for the performing a topology optimization.

14. The method of claim 12, wherein for at least one identified pattern, the identified joint is a pivot joint and the replacing a part of the density field by a material distribution representing a joint, further comprises:

identifying a center of the respective region of the signed field formed by the identified pattern, the center being an element of the respective region of the signed field corresponding to an element of the detection field with the highest associated value of the detection field in the respective region; and replacing the density field in the respective region formed by the set of neighboring elements by a material distribution representing presence of material at the center of the respective region and absence of material elsewhere in the respective region.

15. The method of claim 12, wherein the selecting two or more elements of the signed field (C) further comprises:

identifying two or more elements of the signed field (C) intersecting a sphere centered on the element of the signed field (C) for which the detection field (D) is computed.

16. The method of claim 15, wherein for at least one identified pattern, the identified joint is a pivot joint and the replacing a part of the density field by a material distribution representing a joint, further comprises:

identifying a center of the respective region of the signed field formed by the identified pattern, the center being an element of the respective region of the signed field corresponding to an element of the detection field with the highest associated value of the detection field in the respective region; and replacing the density field in the respective region formed by the set of neighboring elements by a material distribution representing presence of material at the center of the respective region and absence of material elsewhere in the respective region.

17. The method of claim 15, wherein the selecting two or more elements of the signed field (C) further comprises:

setting one or more pairs of antipodal points of the signed field (C) located on the sphere, each pair of antipodal points belonging in a respective pair of antipodal elements, each point of a pair of antipodal points having a value of the computed signed field of its respective element, and wherein the computing a detection field (D) from the computed signed field (C) further comprises:

computing a sum of pairwise products of the respective values of the antipodal points, the sum being computed with formula:

$$D_e = \sum_{i \in N_e} C(\rho_i) \times C(\overline{\rho_i})$$

where $N_e$ is a number of the one or more pairs of antipodal points, $\rho_i$ and $\rho_i$ are a pair i of the one or more pairs of antipodal points, and $C(\rho_i)$ and $C(\overline{\rho_i})$ are the values of the pair i of the one or more pairs of antipodal points.

18. The method of claim 17, wherein for at least one identified pattern, the identified joint is a pivot joint and the replacing a part of the density field by a material distribution representing a joint, further comprises:

identifying a center of the respective region of the signed field formed by the identified pattern, the center being an element of the respective region of the signed field corresponding to an element of the detection field with the highest associated value of the detection field in the respective region; and replacing the density field in the respective region formed by the set of neighboring elements by a material distribution representing presence of material at the center of the respective region and absence of material elsewhere in the respective region.

19. A non-transitory computer readable storage medium having recorded thereon a computer program that when executed by a computer causes the computer to implement a method for designing a 3D modeled object representing a transmission mechanism with a target 3D motion behavior, the transmission mechanism being formed in a material and having at least one joint, the method comprising:

obtaining a 3D finite element mesh;

obtaining data associated to the 3D finite element mesh including:

one or more input forces forming one or more respective loads case, one or more boundary conditions, one or more parameters related to the material, a global quantity constraint relative to a global quantity of the material in the 3D finite element mesh, and a target 3D motion behavior;

performing a topology optimization based on the 3D finite element mesh and on the data associated to the 3D finite element mesh therefore obtaining a density field, the density field representing distribution of material quantity of the 3D modeled object;

computing a signed field (C) based on the density field, and the data associated to the 3D finite element mesh;

identifying one or more patterns of convergence and divergence in the signed field, each of the one or more patterns forming a region of the signed field; and for each identified pattern, identifying a joint representative of the identified pattern and replacing a part of the density field by a material distribution representing the identified joint, each replaced part of the density field corresponding to the respective region of the signed field formed by the identified pattern.

20. A system comprising:

a processor coupled to a memory, the memory having recorded thereon a computer program for designing a 3D modeled object representing a transmission mechanism with a target 3D motion behavior, the transmission mechanism being formed in a material and having at least one joint, that when executed by the processor causes the processor to be configured to:

obtain a 3D finite element mesh, obtain data associated to the 3D finite element mesh including:

one or more input forces forming one or more respective loads case, one or more boundary conditions, one or more parameters related to the material, a global quantity constraint relative to a global quantity of the material in the 3D finite element mesh, and a target 3D motion behavior;

perform a topology optimization based on the 3D finite element mesh and on the data associated to the 3D finite element mesh therefore obtaining a density field, the density field representing distribution of material quantity of the 3D modeled object;

compute a signed field (C) based on the density field, and the data associated to the 3D finite element mesh;

identify one or more patterns of convergence and divergence in the signed field, each of the one or more patterns forming a region of the signed field; and for each identified pattern, identify a joint representative of the identified pattern and replacing a part of the density field by a material distribution representing the identified joint, each replaced part of the density field corresponding to the respective region of the signed field formed by the identified pattern.

* * * * *